(12) United States Patent
Rettig et al.

(10) Patent No.: US 9,170,967 B2
(45) Date of Patent: Oct. 27, 2015

(54) SYSTEM AND METHOD FOR TRANSMITTING INFORMATION FROM A TRANSMITTER TO A RECEIVER VIA A SINGLE LINE

(75) Inventors: Rasmus Rettig, Hamburg (DE); Franziska Kalb, Fichtelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 450 days.

(21) Appl. No.: 13/577,569

(22) PCT Filed: Feb. 8, 2011

(86) PCT No.: PCT/EP2011/051807
§ 371 (c)(1),
(2), (4) Date: Nov. 28, 2012

(87) PCT Pub. No.: WO2011/095635
PCT Pub. Date: Aug. 11, 2011

(65) Prior Publication Data
US 2013/0073757 A1  Mar. 21, 2013

(30) Foreign Application Priority Data

Feb. 8, 2010 (DE) .......................... 10 2010 007 283
Feb. 7, 2011 (DE) .......................... 10 2011 003 729

(51) Int. Cl.
| | |
|---|---|
| G06F 13/42 | (2006.01) |
| G06F 13/36 | (2006.01) |
| G06F 13/38 | (2006.01) |
| H04L 12/403 | (2006.01) |
| H04L 25/49 | (2006.01) |

(52) U.S. Cl.
CPC .............. *G06F 13/36* (2013.01); *G06F 13/385* (2013.01); *H04L 12/403* (2013.01); *H04L 25/4906* (2013.01)

(58) Field of Classification Search
USPC .................................. 710/104–110, 305–315
See application file for complete search history.

(56) References Cited

U.S. PATENT DOCUMENTS

| | | | |
|---|---|---|---|
| 5,668,716 A | 9/1997 | Otomo | |
| 5,761,451 A * | 6/1998 | Abert et al. | 710/113 |
| 5,864,872 A | 1/1999 | Lee et al. | |
| 5,922,061 A * | 7/1999 | Robinson | 710/109 |
| 6,542,947 B1 * | 4/2003 | Buhring | 710/107 |
| 6,799,233 B1 * | 9/2004 | Deshpande et al. | 710/110 |
| 7,103,688 B2 * | 9/2006 | Strong | 710/106 |
| 2003/0070019 A1 * | 4/2003 | Dalakuras et al. | 710/110 |
| 2003/0158983 A1 * | 8/2003 | Dalakuras et al. | 710/107 |
| 2008/0282005 A1 | 11/2008 | Chencinski et al. | |

FOREIGN PATENT DOCUMENTS

| | | |
|---|---|---|
| DE | 0 588 274 | 11/1933 |
| DE | 103 29 707 | 2/2005 |

(Continued)

*Primary Examiner* — Raymond Phan
(74) *Attorney, Agent, or Firm* — Kenyon & Kenyon LLP

(57) ABSTRACT

A method for transmitting logical information from a transmitter to a receiver via a single line, the receiver being connected to the transmitter by the line, the receiver placing a first signal on the line and the first signal being made up of alternating recessive and dominant levels, the transmitter placing a second signal on the line and the second signal being superposed on the line by the transmitter at least in the segments in which the first signal has a recessive level, the second signal being made up of a sequence of recessive and dominant levels, and the receiver determining from the second signal the logical information that is to be received.

12 Claims, 1 Drawing Sheet

(56) References Cited

FOREIGN PATENT DOCUMENTS

| | | |
|---|---|---|
| DE | 10 2005 014783 | 10/2006 |
| DE | 10 2008 062865 | 12/2009 |
| GB | 229 5 039 | 5/1996 |
| WO | 03/005211 | 1/2003 |

* cited by examiner

SYSTEM AND METHOD FOR TRANSMITTING INFORMATION FROM A TRANSMITTER TO A RECEIVER VIA A SINGLE LINE

FIELD OF THE INVENTION

The present invention relates to a circuit and method for communicating via a single line.

BACKGROUND INFORMATION

From the literature, various methods and protocols are believed to be understood for communication between integrated circuits, for example for the purpose of configuration.

Serial interfaces such as SBI transmit data serially but regularly use a plurality of lines, in particular using a further line for synchronization in addition to the data line. Thus, in the case of the SPI interface, each participant is connected to the following three common lines: SDO (Serial Data Out) or MISO (Master In Slave Out), SDI (Serial Data In) or MOSI (Master Out Slave In), and SCK (Serial Clock). In addition, the participants are connected to a common ground.

The interface of the I2C bus, discussed for example in WO 03/005211 A2, is made up of two line terminals and a ground connection, with the possibility of selectively addressing individual participants on the bus.

Patent document US 2008/0282005 A1 discusses a method for communication between integrated circuits that is placed on an existing physical layer of the OSI model, and additionally provides for example configuration information in the associated communication layer. In this way, additional connections are saved.

Patent document DE 0588274 A1 discusses a further method for communication on a line. The transmitter releases the communication line, and the receiver sends pulses that the transmitter counts. At the same time, the receiver checks whether the pulse was correctly outputted on the line. When the number that is to be transmitted is reached, the transmitter again blocks the transmission line. The receiver knows the number of pulses and has thus received the number.

Patent document U.S. Pat. No. 5,668,716 A discusses a design for single-wire communication using an adapter that converts the signals onto a serial two-wire interface.

Patent document GB 2295039 A discusses a serial interface having a line that presupposes that the clock lines of both circuits are coupled and, if warranted, terminated in matching fashion.

In U.S. Pat. No. 5,864,872 A, a serial communication via a line is discussed in which the line is held high by the receiver and the transmitter then, in a defined time interval, either pulls it to ground or leaves it in its high state. The receiver checks the status of the line and recognizes whether 0 or 1 was sent.

SUMMARY OF THE INVENTION

The exemplary embodiments and/or exemplary methods of the present invention describe an interface for communication between two integrated circuits on a single line, e.g. for the transmission of configuration information during the initialization of a control device.

A method as described here can be used for the transmission of configuration data, e.g. for the configuration of CAN transceivers or other integrated circuits that do not have their own non-volatile memory and therefore must receive configuration data when they are switched on.

ADVANTAGES OF THE INVENTION

Advantageously, in the method according to the present invention a transmitter transmits logical information to a receiver via a single line by which the receiver is connected to the transmitter.

The receiver places on the line a first signal made up of alternating recessive and dominant levels, and the transmitter places a second signal on the line, the second signal being superposed on the line by the transmitter at least in the segments in which the first signal has a recessive level, and the second signal being made up of a sequence of recessive and dominant levels. This has the advantage that both the transmitter and the receiver can access the bus and the receiver can determine from the second signal the logical information that is to be received.

In an advantageous realization, as logical information configuration information is transmitted for the initialization of a control device or component or of a bus connection unit.

In a particular realization that is easy to represent, the first signal is made up of a sequence having a prespecified or prespecifiable number of rectangular pulses, the duration of the recessive line level and/or the duration of the dominant line level being approximately constant within the sequence.

It is advantageous if the transmitter begins with the superposition of the second signal after receiving a prespecified or prespecifiable number of recessive and/or dominant levels of the first signal.

An advantage of the represented invention, differing from I2C and SPI, is that only a single line is required, and no use is made of already-existing protocols or communication layers.

In addition, it is advantageous that it requires no additional clock or synchronization lines for the realization of the method, thereby saving costs.

The clock of both circuits does not require any synchronization, which is a further advantage with regard to usability, robustness, and expense of use of the method. Rather, the transmission rate, which according to the exemplary embodiments and/or exemplary methods of the present invention is specified by the receiver, may fluctuate during the transmission. This is advantageous because no requirements are made on a clock pulse generator used for the communication.

The transmission rate of the receiver also need not be known to the transmitter, thus advantageously reducing the configuration outlay for the creation or setting up of the communication.

The exemplary embodiments and/or exemplary methods of the present invention thus allow a simple, low-cost, and robust realization of a single-wire interface, e.g. for the configuration of a component or control device, without the requirement of a synchronization, configuration, or setting of the transmission clock pulse. In the sense explained, the interface is self-synchronizing, including to temporally variable transmission rates.

In the following, the exemplary embodiments and/or exemplary methods of the present invention are explained in more detail on the basis of the drawings.

DETAILED DESCRIPTION

Figure 1:
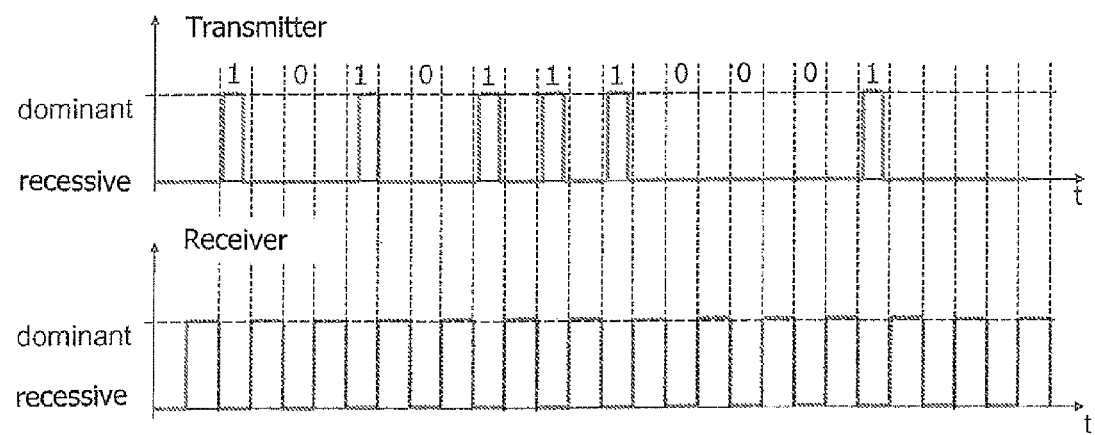
FIG. 1 shows an example of the transmission data of the two participants of the method according to the present invention.

In the following, exemplary embodiments are described of the method and device according to the present invention. These concrete examples are used to explain the realization of the invention, but do not limit the scope of the basic idea of the invention.

One aspect of the method according to the present invention is the synchronization of the two circuits on the transmission line, the synchronization taking place via the transmission of a clock signal by the receiver. This is shown as an example in FIG. 1. In the upper part of the drawing, the signal sent onto the line by the transmitter is shown, and in the lower part the signal sent by the receiver is displayed opposite. The time axes of the two representations agree with one another.

As is shown in FIG. 1, the receiver module sets an approximately rectangular clock signal on the transmission line. The transmitter module detects this clock signal and sets its signal to be transmitted in each of the recessive phases of the clock signal coming in from the receiver. Analogously to the CAN bus, the transmit signals of the two modules are made up of dominant and recessive signals. This means that, when there is simultaneous transmission by a plurality of modules on the line, and thus in the present case simultaneous transmission by the transmitter and receiver, then due for example to the physical boundary conditions of the signal generation the dominant signal "wins." The bus remains at the recessive level only if both participants, i.e. transmitter and receiver, send a recessive signal. If at least one participant sends a dominant signal, the bus is at dominant level. If the dominant line level is interpreted as a logical TRUE condition and the recessive line level is interpreted as a logical FALSE condition, then the signal actually present on the line is an OR linkage of the two signals sent by transmitter and receiver.

In this way, the transmitter sends its data bit-by-bit in the gap between the dominant clock bits of the receiver, these data representing an item of logical information that is to be transmitted to the receiver. As already described, the transmitter observes the transmission line and places its bits to be transmitted in the "recessive gaps" of the clock signal. In the recessive phases of the clock signal that the receiver module sends, the receiver module checks the line for a change of edge from recessive to dominant. If the receiver module detects such a change of edge, this is for example interpreted as a logical one. If the receiver does not measure a change of edge up to the beginning of the next dominant clock bit, this is evaluated as a transmitted logical zero.

Depending on the physical realization of the bus and the particularities of the transmission protocol, recessive bits may also be represented or interpreted as one and dominant bits as zero (inversion). The bits transmitted from the transmitter to the receiver can be put together according to any arbitrary method to form data words, can be used to describe registers in the receiver, or can be processed and/or stored in some other way in the receiver.

As shown in FIG. 1, the clock signal can be made up of equally long dominant and recessive phases, but a clock signal is also possible in which the dominant phases are shorter or longer than the recessive phases. An irregular signal having alternating dominant and recessive levels is also suitable for the method, because the receiver always knows whether an observed dominant bus level was set by the receiver or by the transmitter. Only this factor is decisive for whether the bit is a bit belonging to the logical item of information or is an element of the clock signal, i.e. a clock bit.

Figure 2:
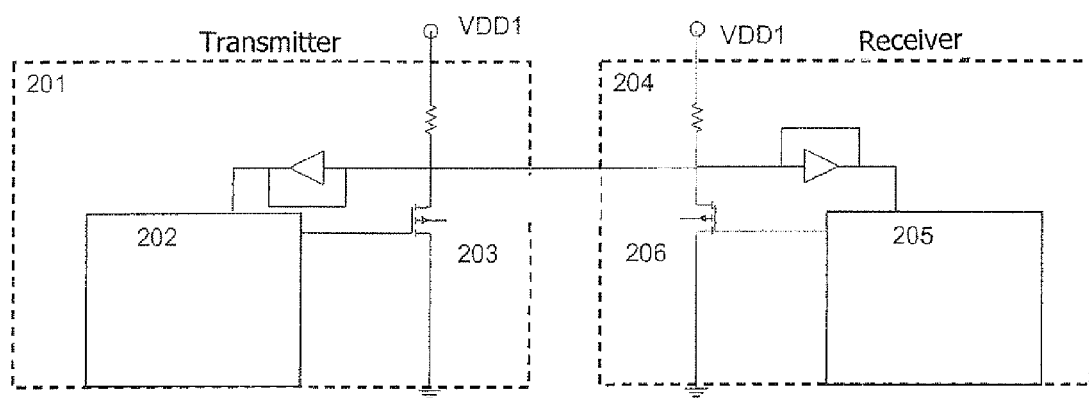
FIG. 2 schematically shows an example of a circuit for carrying out the method according to the present invention.

FIG. 2 shows, as an example, the schematic configuration of the associated circuit, based on an open-drain interface having pull-up resistors: via the represented pull-down transistors 203, 206, transmitter 201 or receiver 204 can pull the transmission line to ground. If this does not happen, at least one pull-up resistor pulls the line to potential VDD1. Here the state "potential of the transmission line is ground" is dominant, and the state "potential of the transmission line is VDD1" is recessive.

Receiver 204 produces the clock signal in that digital logic unit 205 that it contains periodically changes pull-down transistor 206 between blocking and transmission. In the blocking phase (when the transmission line is raised to potential VDD1), transmitter 201 can pull the line to ground by opening its pull-down transistor 203 using digital logic unit 202.

This change of the line level, caused by transmitter 201, is recognized by receiver 204 as a logical one for example at times during which it interprets the absence of the change of line level in the blocking phase of its pull-down transistor 206 as a logical zero. As already mentioned, the representation of one and zero can also be inverted.

The method or the circuit can be used to transmit logical information, in particular configuration information, for initializing a control device or component or a bus connection unit during a system start, the information being transmitted to this device or component or unit. That is, in this case after activation the receiver can begin to continuously specify the clock signal, and can wait for the scattering in of dominant bits by the transmitter. When the expected or required number of bits has been received, the receiver can terminate the transmission of the clock signal.

However, the method can of course also be realized in such a way that the receiver continuously transmits a clock signal. Also possible is a transmission as needed, i.e. in such a way that the receiver begins to send the clock signal whenever it requires a particular item of information from the transmitter.

In the continuous case, the transmitter can begin the transmission of the logical information for example at a time selected by the transmitter itself, or also immediately after having being switched on and having determined the presence of the clock signal from the receiver on the line. If the transmitter does not transmit continuously, but rather for example in packets or in an event-controlled manner, then it makes sense that at the beginning of the transmitted logical information there is transmitted an item of packet start information, for example a leading dominant bit or also a sequence of defined bits, in order to signal to the receiver that a transmission is beginning. It is also conceivable that at the beginning of the logical information there is additionally transmitted an item of length information that indicates how many following logical bits are to be evaluated by the receiver.

In the case in which the receiver places the clock signal onto the line only as needed, it makes sense for the transmitter to begin its transmission of the logical information when it has received a number of clock signals that is prespecified, or is prespecifiable, or also is not determined in more detail. It can terminate its transmission when the data provided for transmission have been completely transmitted. In this case, the receiver can resume the sending of the clock signal at a prespecified, prespecifiable, or not more precisely determined point in time or number of clock signals after it has received the last expected datum.

What is claimed is:

1. A method for transmitting logical information from a transmitter to a receiver via a single line, the receiver being connected to the transmitter by the line, the method comprising:
   placing, using the receiver, a first signal on the line, the first signal being made up of alternating recessive and dominant levels;
   placing, using the transmitter, a second signal on the line without interrupting the first signal on the line, the second signal being superposed with the first signal on the line, the second signal being made up of a sequence of recessive and dominant levels, wherein dominant level segments of the second signal are superposed with recessive level segments of the first signal; and determining, using the receiver, from the second signal, the logical information that is to be received.

2. The method of claim 1, wherein the transmitted logical information is configuration information for initializing one of a control device, a component, and a bus connection unit.

3. The method of claim 1, wherein the first signal is made up of a sequence having a prespecified or prespecifiable number of rectangular pulses, at least one of the duration of the recessive line level and the duration of the dominant line level within the sequence being approximately constant.

4. The method of claim 1, wherein the transmitter begins the superposition of the second signal after receiving a prespecified or prespecifiable number of at least one of recessive levels and dominant levels of the first signal.

5. The method of claim 1, wherein the receiver terminates the transmission of the first signal after receiving a prespecified or prespecifiable number of bits of the second signal.

6. The method of claim 1, wherein the transmitter signals the beginning of the transmission of the second signal through a first dominant bit or a prespecified or prespecifiable sequence of at least one of dominant bits and recessive bits.

7. The method of claim 1, wherein, with the transmission of the second signal to the receiver, the transmitter transmits an item of information stating how many bits make up the transmitted second signal.

8. The method of claim 1, wherein the receiver either interprets the dominant levels of the second signal as logical ones and the recessive levels of the second signal as logical zeroes or interprets the dominant levels of the second signal as logical zeroes and the recessive levels of the second signal as logical ones.

9. A transmitter for transmitting logical information to a receiver via a single line, the transmitter being connected to the receiver by the line, comprising:
    a receiving arrangement to receive a first signal from the receiver, the first signal being made up of alternating recessive and dominant levels;
    a transmitting arrangement to transmit a second signal via the line without interrupting the first signal on the line, the second signal being superposed with the first signal on the line, the second signal being made up of a sequence of recessive and dominant levels, wherein dominant level segments of the second signal are superposed with recessive level segments of the first signal; and
    an entering arrangement to enter the logical information that is to be transmitted into the second signal.

10. The transmitter of claim 9, wherein the logical information to be transmitted is transmitted to the receiver via a single line, the receiver being connected to the transmitter by the line, by performing the following:
    placing, using the receiver, a first signal on the line, the first signal being made up of alternating recessive and dominant levels;
    placing, using the transmitter, a second signal on the line without interrupting the first signal on the line, the second signal being superposed with the first signal on the line, the second signal being made up of a sequence of recessive and dominant levels, wherein dominant level segments of the second signal are superposed with recessive level segments of the first signal; and
    determining, using the receiver, from the second signal, the logical information that is to be received;
    wherein the transmitted logical information is configuration information for initializing one of a control device, a component, and a bus connection unit.

11. A receiver for receiving logical information from a transmitter via a single line, the receiver being connected to the transmitter by the line, comprising:
    a transmitting arrangement to transmit a first signal to the transmitter, the first signal being made up of alternating recessive and dominant levels; and
    a reading-out arrangement to read out a second signal from the level on the line without interrupting the first signal on the line, the second signal being superposed with the first signal on the line, the second signal being made up of a sequence of recessive and dominant levels, wherein dominant level segments of the second signal are superposed with recessive level segments of the first signal, and to read out from the second signal the logical information that is to be received.

12. The receiver of claim 11, wherein the logical information is transmitted from a transmitter via the single line, the receiver being connected to the transmitter by the line, by performing the following:
    placing, using the receiver, a first signal on the line, the first signal being made up of alternating recessive and dominant levels;
    placing, using the transmitter, a second signal on the line without interrupting the first signal on the line, the second signal being superposed with the first signal on the line, the second signal being made up of a sequence of recessive and dominant levels, wherein dominant level segments of the second signal are superposed with recessive level segments of the first signal; and
    determining, using the receiver, from the second signal, the logical information that is to be received;
    wherein the transmitted logical information is configuration information for initializing one of a control device, a component, and a bus connection unit.

* * * * *